Figure 1:
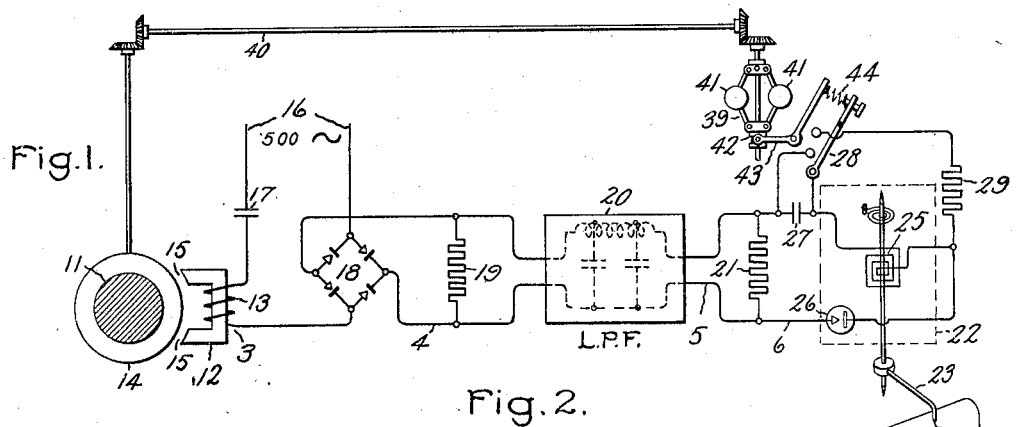

April 27, 1937.  C. D. GREENTREE ET AL  2,078,796

VIBRATION METER

Filed Nov. 1, 1934   2 Sheets-Sheet 1

Inventors:
Charles D. Greentree,
Milton S. Mead Jr.,
by Harry E. Dunham
Their Attorney.

Inventors:
Charles D. Greentree,
Milton S. Mead Jr.,
by Harry E. Dunham
Their Attorney.

Patented Apr. 27, 1937

2,078,796

UNITED STATES PATENT OFFICE 2,078,796

VIBRATION METER

Charles D. Greentree and Milton S. Mead, Jr., Schenectady, N. Y., assignors to General Electric Company, a corporation of New York Application November 1, 1934, Serial No. 751,000

18 Claims. (Cl. 177—351)

Our invention relates to apparatus for measuring vibration and eccentricity. The invention concerns particularly measuring methods and apparatus for use with vibrating or rotating bodies.

When starting steam turbines, particularly large turbines used in electric central stations, it is necessary to employ great care to avoid damaging the blades or other parts of the turbine. After the turbine has been left standing for a certain length of time, there is a tendency for the shaft or other parts to acquire a set which prevents the turbine from rotating true and throws it out of balance when it is started. Uneven heating as the steam is admitted for starting also results in uneven expansion and lack of symmetry and balance of the rotor of the turbine. In order to prevent damage to the turbine, it is customary to start it very slowly to allow the sets to work out and to permit all parts of the turbine to become evenly heated. Without means for determining when the shaft has begun to rotate uniformly, it is necessary for the sake of safety to make the starting period longer than would otherwise be required. The measurement is made more difficult by reason of the fact that the shaft may ride up in the bearing to a different average position as well as varying cyclically from this average position, owing to the rotation of the shaft.

It is an object of our invention, therefore, to provide a simple, rugged, easily constructed apparatus and a method for measuring the shaft eccentricity during the starting of the turbine and for shortening the time required for safely bringing a turbine up to speed.

It is also an object of our invention to provide an apparatus and method for measuring shaft eccentricity which is unaffected by comparatively slow transverse shift or displacement of a shaft as distinguished from the cyclical displacement due to the eccentricity.

Still another object is the measurement of eccentricity and average displacement independently.

Still another object is the measurement of the eccentricity or the vibration of any rotating or non-rotating body where the average displacement of the body with respect to a datum does not remain constant.

Other and further objects and advantages will become apparent as the description proceeds.

In accordance with our invention in its preferred form, a detector coil mounted on a core of magnetizable material and connected to a constant voltage source of alternating current is placed in proximity to the rotatable shaft or equivalent part of the apparatus, the eccentricity of which is to be measured, thus forming an air gap. The adjacent rotating part forming one boundary of the gap is of course made of magnetic material. The impedance of the coil and the current therein obviously depend upon the length of the air gap which is determined by relative positions of the shaft and the coil. The current output of the detector circuit is rectified and filtered to produce a modulated current having components representing the average gap and the eccentricity of the rotating shaft. The average value of the modulated current is measured to determine the value of the average gap and the alternating-current component is measured to determine the eccentricity of the shaft.

Figure 2:
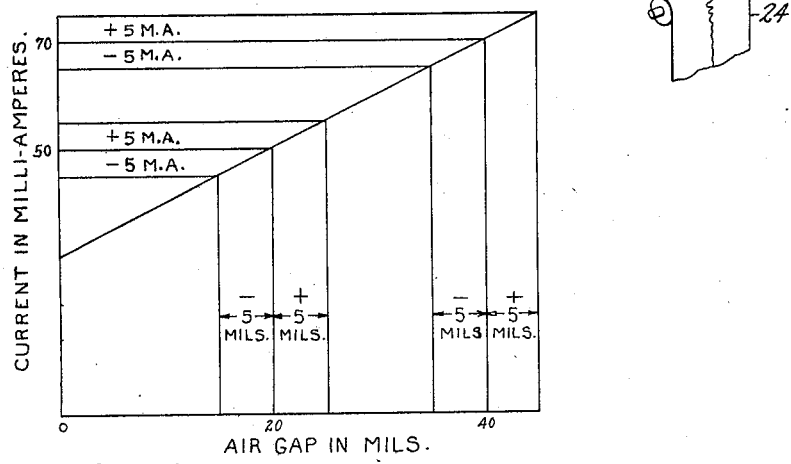
Figure 7:
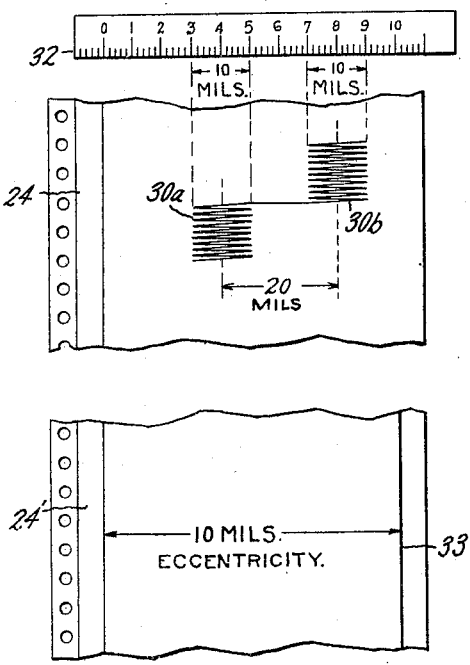
Figure 8:
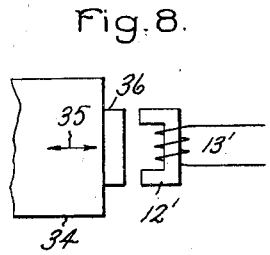

The features of our invention which we believe to be novel and patentable will be pointed out in the claims appended hereto. A better understanding of our invention may be obtained by referring to the following description taken in connection with the accompanying drawings in which Fig. 1 is a schematic diagram showing the electrical circuit of one embodiment of our invention; Fig. 2 is a graph illustrating the relationship between the current in the magnetic pick-up and the air gap between the pick-up and the shaft; Figs. 3a, 3b, 4a, 4b, 5a, 5b, 6a and 6b are graphs showing the instantaneous values of current in various portions of the apparatus; Fig. 7 illustrates the records obtained on the record charts which may be used with our apparatus, and Fig. 8 represents in part another embodiment of our invention.

Referring now more in detail to Fig. 1, the rotatable shaft of the apparatus to be measured is represented in cross section at 11. A detector consisting of a U-shaped magnetic core 12 and an electrical winding 13 is fixedly mounted at some convenient point along the shaft 11 and in proximity thereto. Preferably, for reasons which will be explained hereinafter, a ring 14 composed of annular laminations of magnetic material is shrunk on or otherwise securely fastened to the shaft 11, and the core 12 is also laminated. Air gaps 15 are thereby formed between the core 12 and the annular ring 14.

The winding 13 is energized by a source of alternating current 16, preferably of audio frequency. We have found that a frequency of five hundred cycles is satisfactory for the purpose. A condenser 17 is connected in series with the winding 13 for the purpose of minimizing the effect of leakage reactance of the winding 13.

A full wave rectifier 18, for example, one of the bridge type consisting of four copper oxide rectifier elements, is provided to rectify the current supplied to the remainder of the apparatus. A resistor 19 is connected across the output terminals of the rectifier. A low-pass filter 20 is connected with input terminals across the ends of the resistor 19 and a second resistor 21 is connected across the output terminals of the low-pass filter 20. The filter 20 is designed to pass pulsations having frequencies up to about 60 cycles per second with minimum attenuation and to attenuate very greatly pulsations having frequencies of the order of 500 cycles and higher.

For the purpose of measuring the rectified, filtered current output from the circuit of the winding 13 and the source 16, a current-responsive instrument 22 is connected across the ends of resistor 21. Although the current-responsive instrument 22 may take the form of either an indicating or recording instrument, we have illustrated an arrangement in which a pointer 23 of the instrument 22 is arranged to draw a curve on a record chart 24. The instrument 22 is preferably one which is responsive to both alternating current and direct current. It may take the form, for example, of a d'Arsonval instrument having a movable coil 25 connected in series with a rectifier 26.

For the purpose of blocking out the unvarying direct current component of the output of low-pass filter 20, a condenser 27 is provided which is connectible in series with the instrument 22. A switch 28 is also provided to permit connecting a shunt 29 aross the instrument 22 to decrease its sensitivity under certain conditions and to permit short-circuiting the condenser 27 when it is desired to measure all components of current passed by the low-pass filter 20.

We consider it desirable to have the apparatus arranged to open the switch 28 when the turbine is changed from very slow rotation by turning gear to faster rotation under steam. If desired, a speed-responsive mechanism 39 connected to the shaft 11 in a suitable manner may be provided for controlling the switch 28. For example, the speed-responsive mechanism 39 may take the form of a fly-ball governor geared to the shaft 11 through shafting 40 and having a pair of flyballs 41 which raise an annularly grooved collar 42 when the shaft 11 attains a predetermined speed, e. g., between one and two revolutions per second. A bell crank 43 is provided, having one arm engaging the annular groove in the collar 42 and a second arm engaging the handle of switch 28. Preferably, a tension and compression spring 44 is interposed between the bell crank 43 and the switch 28.

It will be apparent that, as lateral displacement of the shaft 11 takes place, a variation will also take place in the length of the air gap 15 between laminated ring 14 and the core 12 of the stationary magnetic pickup. The lateral displacement of the shaft 14 may either be cyclic due to eccentricity of the shaft or it may be continuous due to the fact that the shaft 11 has been caused to shift in its bearings. Our apparatus is so arranged that both the eccentricity and the amount of shift may be measured separately and if desired, simultaneously. It will be apparent that the reactance of the winding 13 will vary inversely with the length of the air gaps 15. If the design is such that the impedance of winding 13 is almost wholly reactive, the impedance will be very nearly in inverse proportion to the length of the air gaps 15. This is important in order to obtain linearity of response of the apparatus, the advantage of which will be explained hereinafter.

The resistance component of the impedance due to the actual resistance of the winding can be minimized by holding the resistance at a low value and employing a sufficient number of turns to obtain a high reactance. In order to eliminate substantially any effective resistance due to eddy currents and hysteresis in the core 12 or in the shaft 11, the core 12 is laminated and the shaft 11 is surrounded with the laminated ring 14 of relatively permeable material so that the magnetic flux passes through only the ring 14 and not through the shaft 11. The leakage flux of the winding 13 may be sufficient to cause a slight departure from the inverse ratio between the length of the air gap 15 and the reactance of the winding 13. This effect may be overcome by utilizing a condenser 17 of such capacity as to neutralize the leakage reactance.

Since the reluctance of the magnetic circuit varies linearly with the air gap, the reactance varies inversely with reluctance and the current in turn varies inversely with the reactance or directly with the reluctance, there will be a linear relationship between the current flowing in winding 13 and the length of the air gap. This is illustrated in Fig. 2.

From an inspection of Fig. 2, it will be apparent that a given eccentricity of the shaft 11 will cause the same variation in current irrespective of the average gap 15 between ring 14 and detector unit 12. For example, let it be assumed that a current of fifty milliamperes corresponds to an air gap of twenty mils. Then, an eccentricity of the shaft 11 causing cyclic displacement of the shaft 11 of five mils either side of the mean position will result in alternately increasing and decreasing the air gap by an amount of five mils. A linear variation in the current will take place which, for the sake of illustration, may be assumed to be plus or minus five milliamperes. If the shaft 11 should shift transversely in its bearings to such a position that the average air gap is forty mils instead of twenty mils for the same eccentricity, there would still be a variation of plus or minus five milliamperes but the average current would have increased to seventy milliamperes.

Figure 3A:
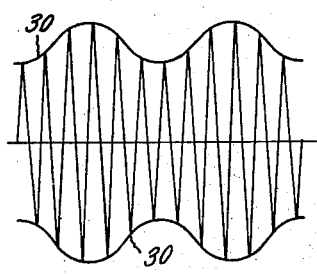
Figure 3B:
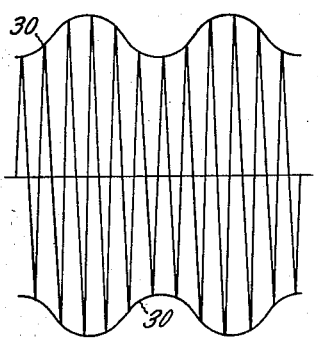

The instantaneous values of current for the two above mentioned conditions of shift of the shaft 11 are illustrated in Figs. 3a and 3b representing currents at the point marked 3 in Fig. 1. Since the source of current 16 supplies current at five hundred cycles, the current in winding 13 will be represented by a sine wave having a frequency of five hundred cycles and varying in amplitude at a frequency corresponding to the speed of revolution of the shaft 11. The maximum values of the current may be represented by an envelope 30 enclosing the five hundred cycle wave.

Fig. 3a represents the condition where the average air gap is twenty mils and Fig. 3b represents the condition where the average air gap is forty mils. It will be seen that the curves are similar except that, in Fig. 3b, the envelope 30 is at a greater distance from the horizontal zero axis.

Figure 4A:
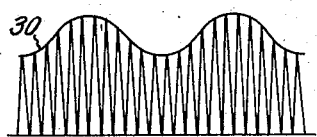
Figure 4B:
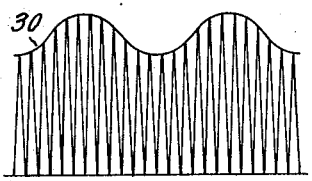

The effect of the full wave rectifier 18 is illustrated in Figs. 4a and 4b, representing currents at the point marked 4 in Fig. 1, in which the lower halves of the five hundred cycle waves are turned upward to produce direct current waves of one thousand pulsations per second having maximum values represented by envelopes 30 at proportionally the same distances from the zero axis as in Figs. 3a and 3b.

Figure 5A:
Figure 5B:
Figure 6A:
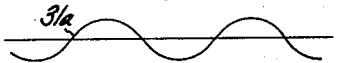
Figure 6B:

The effect of the low-pass filter 20 is shown in Figs. 5a and 5b, representing the currents flowing at the point marked 5 in Fig. 1. Since the filter 20 smooths out the current wave and overcomes the high frequency pulsations, the current at the point 5 is a fluctuating direct current, as shown in Figs. 5a and 5b, which fluctuates at a frequency corresponding to the eccentricity frequency, that is, the speed of revolution of the shaft 11. The values of the ordinates of the curves 30a and 30b, obviously, represent the length of the air gap at any instant, and the average value of curve 30a provides a measure of the average gap for the condition where the average air gap was twenty mils, and similarly the average value of curve 30b represents the average gap for the condition where the average air gap was forty mils.

The resistors 19 and 21 provide non-inductive continuous current paths for the currents at 4 and 5, respectively, and the voltages therein are obviously proportional to the respective currents.

In order to measure only the eccentricity of the shaft, the condenser 27 is interposed between the instrument 22 and the resistor 21 so that the steady value direct-current component of the curves 30a and 30b in Figs. 5a and 5b is blocked out and only the pulsating-current component 31a or 31b, Fig. 6, can pass on to the instrument. Since the eccentricity was the same in the two illustrative conditions assumed, the curves 31a and 31b are identical.

It will be seen, therefore, that our apparatus permits measuring eccentricity independently of the average gap, i. e. independently of changes in the average gap due to shaft shift.

It is necessary for the apparatus to be responsive under a wide variation of conditions of speed of the shaft 11 since in a steam turbine, when turning gear (not shown) is first applied, the shaft may rotate only one revolution in forty-five seconds, whereas, when the shaft has come up to speed, the speed of revolution may be of the order of thirty or sixty revolutions per second. Preferably, for this reason, at the beginning of the starting period, the switch 28 is moved to the left, short-circuiting condenser 27 and connecting the shunt 29 across the instrument 22 to reduce its sensitivity.

Referring to Fig. 7, 24 represents a portion of the record chart of the recording instrument 22. When the turbine is on turning gear and the record chart 24 is moved at a slow speed the curves 30a and 30b corresponding to Figs. 5a and 5b appear as solid blocks of ink owing to the record lines being very close together. The distance between the maximum and minimum points of the blocks 30a and 30b being ten mils according to the lower calibration of the scale 32, the record immediately shows that the eccentricity is the same, namely, ten mils, under the two assumed conditions of operation and the average values of the blocks 30a and 30b show that the shaft has shifted 20 mils between the two assumed conditions of average gap of 20 and 40, respectively.

As the turbine is speeded up, the eccentricity frequency becomes so great that the pointer 23 of the instrument cannot follow the fluctuations of the curves 30a or 30b and the curve obtained follows the average value of curve 30a or 30b in Figs. 5a and 5b and represents the value of the average gap. Changes in this value of average gap represent the value of shaft shift.

When it is desired to measure the eccentricity of the shaft at higher speeds, the switch 28 is moved to the right, connecting condenser 27 in series with the instrument 22 and removing the shunt 29 to increase the sensitivity of the instrument. The instrument deflection is then proportional to the height of the curve 31a or 31b of Figs. 6a and 6b and is represented by curve 33 shown at 24′ of the record chart in Fig. 7. This curve is read with the upper calibration of the scale 32 and indicates an eccentricity of ten mils, the indication being independent of shaft shift. If desired, two separate instruments may be employed in order to measure shaft eccentricity and average displacement or shift simultaneously. In this case one instrument, which need only be an alternating current instrument, is connected as shown in series with the condenser 27 and the other, which need only be a direct current instrument, is connected across the resistor 21, corresponding to the instrument connection shown when the switch 28 is closed.

The switch 28 may be permitted to be operated automatically by the speed-responsive mechanism 39. As the turbine shaft 11 is being turned over slowly by means of the turning gear customarily employed in connection with such apparatus, the eccentricity and shift of the shaft 11 may both be checked by observing the record chart as shown at 24 in Fig. 7 and explained above. When steam is admitted to the turbine, it speeds up to between one and two revolutions per second and the speed-responsive mechanism 39 operates, rotating the bell crank 43 clockwise and compressing the spring 44 to open the switch 28. The instrument 22 is then connected for high sensitivity and directly indicating shaft eccentricity as hereinbefore explained. When the turbine is shut down and the shaft speed drops below the value for which the speed mechanism 39 is set, the bell crank 43, of course, rotates counterclockwise, stretching the spring 44 and closing the switch 28. Although the switch 28 is normally biased to either a closed position or an open position, the resilience of the spring 44 permits moving the switch manually to the opposite position, if desired.

When the apparatus is initially installed, the maximum eccentricity (calculated from design constants) which may safely be permitted in starting the turbine is checked experimentally by simultaneously observing the indications or records of shaft eccentricity and shift and determining the rubbing, vibration, and other danger symptoms of the turbine as it is speeded up as fast as the condition of rubbing, vibration, etc., permits. The special apparatus for checking these other factors constitutes no part of the present invention and need, therefore, not be described. Subsequently, however, the turbine may be started and brought up to speed by relatively unskilled and untrained operators within the minimum permissible time merely by observing the instrument 22 and increasing the speed at such a rate that the shaft eccentricity remains within the prescribed limits.

For the sake of illustration, we have described our invention as an eccentricity meter for a rotating shaft but it will be understood that our invention is not limited thereto but its principle is equally applicable to measuring the amplitude of vibration of a body moving back and forth along a straight line or some other path. For example, in Fig. 8, the amplitude of vibration of a body 34 in the directions of the double-headed arrow 35 may be measured by means of a detector unit 13' together with the apparatus shown in Fig. 1. Preferably, a laminated magnetic armature 36 for the detector unit 13' is secured to the vibrating body 34. For the reasons already explained, a measurement of amplitude of vibration of the body 34 may be obtained independently of variations in the average value of the gap between armature 36 and detector unit 13', which may result from changes in the mean position of the body 34. It will be apparent that, even if the body 34 tends to vibrate in other directions as well as along the double-headed arrow 35, the reading obtained will be a measure of the component of vibratory motion along double-headed arrow 35, or the translatory motion.

Having thus described the essential novel features of our invention and mentioned specific applications thereof, we desire to have it understood that such other modifications and applications as are commensurate with the scope of the invention are intended to be included in the appended claims.

What we claim as new and desire to secure by Letters Patent of the United States, is,—

1. A combined eccentricity and shift indicator for rotating shafts comprising in combination, a laminated magnetic ring mounted around a shaft with which the indicator is to be used, a stationary laminated magnetic core having pole portions toward the periphery of said ring leaving air gaps therebetween varying with the transverse motion of the shaft, an electrical winding on said core, a condenser, a source of alternating current supplying said winding and said condenser in series, a rectifier having input terminals interposed in said circuit and having output terminals, a resistor connected between the output terminals of said rectifier, a second resistor, a low-pass filter connecting said resistors in parallel, an instrument responsive to alternating and direct currents connected across said second resistor, and a condenser connectible in series with said instrument.

2. An eccentricity indicator for rotating shafts comprising in combination, a laminated magnetic ring mounted around the shaft with which the indicator is to be used, a stationary laminated magnetic core having pole portions toward the periphery of said ring leaving air gaps therebetween varying with the transverse motion of the shaft, an electrical winding on said core, a source of alternating current supplying said winding, a rectifier having input terminals interposed in said circuit, a current-responsive instrument connected in the output circuit of said rectifier, a low-pass filter interposed in said output circuit, and a blocking condenser connected between said low-pass filter and said instrument, whereby the response of said instrument is proportional to the cyclic variation in the current in said electrical winding and to the cyclic displacement of said shaft.

3. An eccentricity indicator for rotating shafts comprising in combination, a detector unit having a magnetic core with pole pieces adapted to be mounted in proximity to a shaft to be observed and a winding on said core, a source of current, a rectifier supplied by said source in series with said detector unit winding, an alternating-current electrical instrument supplied by said rectifier, a blocking condenser in series with said instrument, and a low-pass filter interposed between said instrument and condenser and said rectifier.

4. A device for observing the vibration of rotating shafts comprising in combination, a magnetic detector unit having relatively movable magnetic core elements with an air gap between them, one of which elements rotates with said shaft, and a current-conducting winding in inductive relation to said magnetic core elements a source of alternating current of a frequency high in comparison with the expected rotational speed of the shaft energizing said detector winding, and an alternating-current electrical instrument responsive only to relatively low-frequency currents and in electroresponsive relation with said detector unit winding.

5. Means for observing the vibration of rotating shafts comprising, a source of alternating current relatively high in frequency compared to the speed of rotation of a shaft to be observed, means connected to said source for modulating said current in response to the component of motion of a point in the axis of said shaft along a line transverse thereto, and an electrical instrument responsive to alternating currents of low frequency only, connected to said modulating means, and energized by said modulated current.

6. Means for observing the vibration of rotating shafts comprising in combination, a source of alternating current relatively high in frequency when compared to the speed of rotation of a shaft to be observed, means connected to said source for modulating said current in response to variations in the transverse position of a point in the axis of said shaft, an electrical instrument responsive only to direct current and low frequency alternating current connected to said modulating means and energized by said modulated current and means for rectifying the modulated current.

7. A device for observing the vibration of rotating shafts comprising in combination, a source of alternating current having a frequency high in comparison with the expected speed of said shaft, a laminated ring of magnetic material mounted around said shaft, a magnetic detector unit having a laminated core with pole portions mounted in proximity to the periphery of said laminated ring, a winding on said core connected to said current source, and an electrical instrument, responsive to alternating currents of low frequency only, connected in electroresponsive relation with said magnetic detector unit winding.

8. A device responsive to the translatory component of motion of a moving body having both a cyclical motion and a random motion comprising in combination, a detector unit having a magnetic core with pole pieces adapted to be mounted in proximity to a portion of the moving body and a winding on said core, a source of current, a rectifier supplied by said source in series with said detector unit winding, an alternating-current electrical instrument supplied by said rectifier, a blocking condenser in series with said instrument, and a low-pass filter interposed between said instrument and condenser and said rectifier.

9. A device responsive to the translatory component of vibration of a moving body tending to vibrate with a given frequency, said device comprising in combination, a magnetic detector unit having relatively movable magnetic core elements with an air gap between them, one of which elements is carried by said moving body, and a current-conducting winding in inductive relation to said magnetic core elements, a source of current energizing said detector unit winding, an instrument responsive to alternating current of the frequency at which the moving body tends to vibrate, said instrument being in electroresponsive relation to said winding, and a blocking condenser in series with said instrument.

10. A device responsive to the translatory component of vibration of a moving body having a cyclical component in its motion, said device comprising in combination a magnetic detector unit having relatively movable magnetic core elements with an air gap between them, one of which elements is carried by said moving body, and a current-conducting winding in inductive relation to said magnetic core elements, a source of current energizing said detector unit winding, an instrument responsive to alternating current of the frequency at which the moving body tends to vibrate, said instrument being in electroresponsive relation to said winding, a source of alternating current of a frequency high in comparison with the periodicity of the cyclical motion of the body and connected to said detector unit winding, and an alternating-current electrical instrument responsive to only relatively low-frequency currents and connected in electroresponsive relation with said detector unit winding.

11. Means responsive to the translatory component of motion of a moving body having a cyclical component in its motion, said means comprising in combination a source of alternating current relatively high in frequency compared to the periodicity of the cyclical component of motion of the body, means connected to said source for modulating said current in response to the component of motion of a point in a moving body along a given line, and an electrical instrument responsive to alternating currents of low frequency only, connected to said modulating means, and energized by said modulated current.

12. A device responsive to the translatory component of motion of a moving body including a cyclical component in its motion comprising a member composed of magnetizable material moved by said moving body, a magnetic detector unit having an electrical winding and mounted in proximity to said magnetizable member to form an air gap therebetween, the length of which determines the reactance of said winding, a source of current, an electrical instrument energized by said source of current in series with said detector unit, and means neutralizing the leakage reactance inherent in said winding whereby the response of said instrument is made to vary linearly with variations in the length of said air gap.

13. A vibration-measuring device comprising in combination, a magnetizable member subject to motion and having a cyclical component in its motion, a stationary detector unit having an electrical winding and mounted in proximity to said magnetizable member to form an air gap therebetween, means responsive to variations in the reactance of said winding and means neutralizing the leakage reactance inherent in said winding, whereby the reciprocal of the resultant reactance varies linearly with variations in the length of said air gap, and means responsive to variations in the resultant reactance.

14. A vibration-responsive device comprising in combination, a member of magnetizable material adapted to follow the motion of a body having a cyclical component in its motion, a stationary magnetic detector unit having an electrical winding and mounted in proximity to said member to form an air gap therebetween, a source of current and an electrical instrument energized by said source of current in series with said winding, and means for producing a linear relationship between the current in said instrument and variations in the length of said air gap.

15. A vibration-responsive device comprising in combination, a member composed of magnetizable material adapted to follow the motion of a moving body having a cyclical component in its motion, a stationary detector unit composed of magnetizable material mounted in proximity to said member to form an air gap therebetween, and means linearly responsive to variations in the reluctance of a magnetic circuit formed by said member, said stationary detector unit, and the intervening air gap.

16. A vibration-measuring device comprising in combination, a laminated armature of magnetizable material subject to motion with a cyclical component, a stationary detector unit having a laminated magnetic core and an electrical winding thereon, said core being mounted in proximity to said armature to form an air gap therebetween, a source of alternating current, a condenser connected in series with said current source and said winding to neutralize the leakage reactance inherent in said winding, whereby the reciprocal of the resultant reactance of the alternating-current circuit varies linearly with variations in the length of said air gap, and means responsive to variations in the resultant reactance.

17. An eccentricity responsive device for rotating shafts tending to vibrate with a given frequency of vibration, said device comprising in combination, a magnetic detector unit having relatively movable magnetic core elements with an air gap between them, one of which elements rotates with said shaft, and a current-conducting winding in inductive relation to said magnetic core elements, a source of current energizing said detector unit winding, an instrument responsive to alternating current of the frequency at which the shaft tends to vibrate, said instrument being in electroresponsive relation to said winding, and a blocking condenser in series with said instrument.

18. Means for continuously observing the vibration of the shaft of a rotating machine as it is brought up to speed which comprises a magnetic detector unit having relatively movable magnetic core elements with an air gap between them, one of which elements rotates with said shaft, and a current-conducting winding in inductive relation to said magnetic core elements, a source of current energizing said detector unit winding, an instrument responsive to alternating current of the frequency at which the shaft tends to vibrate, said instrument being in electroresponsive relation to said winding, a blocking condenser in series with said instrument, a switch adapted to short circuit said condenser, and means for opening said switch as the shaft speed exceeds a predetermined value.

CHARLES D. GREENTREE.
MILTON S. MEAD, JR.